United States Patent
Yoon (10) Patent No.: US 10,902,010 B2
(45) Date of Patent: Jan. 26, 2021

(54) COLLECTIVE INTELLIGENCE CONVERGENCE SYSTEM AND METHOD THEREOF

(71) Applicant: Seong Min Yoon, Guri-si (KR)

(72) Inventor: Seong Min Yoon, Guri-si (KR)

(*) Notice: Subject to any disclaimer, the term of this patent is extended or adjusted under 35 U.S.C. 154(b) by 281 days.

(21) Appl. No.: 15/972,356

(22) Filed: May 7, 2018

(65) Prior Publication Data
US 2018/0357243 A1  Dec. 13, 2018

(30) Foreign Application Priority Data
Jun. 8, 2017  (KR) .................. 10-2017-0071620

(51) Int. Cl.
| G06F 3/0481 | (2013.01) |
| G06F 16/25 | (2019.01) |
| G06F 16/28 | (2019.01) |
| G06F 16/2457 | (2019.01) |
| G06Q 90/00 | (2006.01) |

(52) U.S. Cl.
CPC ...... *G06F 16/252* (2019.01); *G06F 16/24578* (2019.01); *G06F 16/285* (2019.01); *G06Q 90/00* (2013.01)

(58) Field of Classification Search
CPC .............. G06F 16/252; G06F 16/285; G06F 16/24578; G06Q 90/00
See application file for complete search history.

(56) References Cited

U.S. PATENT DOCUMENTS

| 9,705,966 | B1* | 7/2017 | Cherukuri | ............... H04L 67/10 |
| 2009/0077633 | A1* | 3/2009 | Icho | .................. G06Q 30/02 726/3 |
| 2010/0299301 | A1* | 11/2010 | Busch | .................. G06N 5/022 706/46 |
| 2011/0040592 | A1* | 2/2011 | Kurtzig | .................. G06Q 10/10 705/7.35 |
| 2011/0252121 | A1* | 10/2011 | Borgs | .................. G06Q 10/10 709/223 |
| 2014/0006308 | A1* | 1/2014 | Baggott | ............ G06Q 30/0201 705/347 |
| 2015/0379879 | A1* | 12/2015 | Selkirk | .................. G06Q 10/00 434/309 |
| 2016/0248848 | A1* | 8/2016 | Sugaya | .................. H04L 65/40 |
| 2017/0213259 | A1* | 7/2017 | Gruber | .................. G06Q 20/32 |
| 2017/0315764 | A1* | 11/2017 | Patel | .................. G06F 3/1208 |
| 2018/0121830 | A1* | 5/2018 | Schmid | .................. G06Q 50/01 |
| 2018/0173713 | A1* | 6/2018 | Lawbaugh | ............ G06F 16/958 |

FOREIGN PATENT DOCUMENTS

KR  10-2009-0095097 A  9/2009

* cited by examiner

*Primary Examiner* — Tarek Chbouki
(74) *Attorney, Agent, or Firm* — LRK Patent Law Firm (57) ABSTRACT

A collective intelligence convergence system based on a required reading opinion and a method thereof which calculates a result using the required reading opinion which necessarily includes opinions of experts in a corresponding field and includes opinions of ordinary persons when a public opinion or questionnaire survey is conducted.

6 Claims, 5 Drawing Sheets

| Participant | | 1 | 2 | 3 | 4 | 5 | 6 | 7 | 8 | 9 | 10 | a.s. | Y.No. |
|---|---|---|---|---|---|---|---|---|---|---|---|---|---|
| Agreement opinion | | | | | | | | | | | | | |
| Required | 1 | Y 95 | Y 99 | Y 99 | Y 94 | Y 88 | Y 90 | Y 91 | Y 56 | N 15 | N 3 | 73.1 | 6 |
| | 2 | Y 92 | Y 95 | Y 98 | Y 88 | Y 92 | Y 81 | N 45 | Y 75 | N 20 | N 2 | 68.8 | 7 |
| | 3 | N 48 | Y 87 | Y 96 | Y 75 | N 45 | Y 85 | Y 95 | Y 65 | Y 51 | N 5 | 65.5 | 7 |
| | | | | | | | | | | | | 69.13333 | |
| Selection | 1 | Y 90 | | | Y 89 | Y 99 | Y 69 | Y 82 | | | N 9 | 62.5 | 3 |
| | 2 | | Y 90 | Y 91 | | Y 75 | | N 30 | Y 63 | N 30 | | 62.2 | 3 |
| | 3 | | | | | | | Y 45 | | | N 7 | 61.6 | 3 |
| | 4 | Y 78 | | N 45 | | | N 47 | Y 88 | | N 7 | N 2 | 44.5 | 2 |
| | 5 | N 20 | Y 68 | | | N 34 | N 35 | | | | | 32.8 | 1 |
| Average | | 70.5 | 87.8 | 86 | 86.5 | 72.17 | 68.33 | 68 | 64.75 | 21.67 | 4.667 | | |
| Opposition opinion | | | | | | | | | | | | | |
| Required | 1 | N 15 | N 40 | N 20 | Y 65 | Y 70 | Y 85 | Y 75 | Y 55 | Y 95 | Y 99 | 61.9 | 7 |
| | 2 | N 5 | N 20 | N 5 | Y 79 | N 46 | Y 66 | Y 88 | N 42 | Y 94 | Y 99 | 54.4 | 5 |
| | 3 | Y 80 | N 10 | N 10 | N 35 | N 39 | Y 86 | N 45 | Y 30 | Y 83 | Y 99 | 52.2 | 4 |
| | | | | | | | | | | | | 56.16667 | |
| Selection | 1 | N 15 | N 15 | N 5 | N 45 | Y 45 | N 37 | Y 88 | Y 62 | N 46 | Y 98 | 55.5 | 3 |
| | 2 | N 35 | N 15 | N 18 | Y 67 | Y 67 | N 21 | Y 77 | | Y 94 | Y 73 | 47.5 | 3 |
| | 3 | | | Y 55 | N 35 | N 28 | | N 34 | Y 51 | Y 82 | | 46 | 3 |
| | 4 | N 13 | N 30 | N 5 | N 10 | Y 48 | N 15 | N 40 | Y 70 | | Y 93 | 40 | 2 |
| | 5 | N 5 | N 46 | | | | | | Y 61 | | Y 89 | 38 | 2 |
| Average | | 25.5 | 25.14 | 16.86 | 44.83 | 49 | 51.67 | 63.86 | 50.17 | 79.17 | 92.86 | | |
| Decision | | YES | YES | YES | YES | YES | YES | YES | YES | NO | NO | | |

FIG. 5

COLLECTIVE INTELLIGENCE CONVERGENCE SYSTEM AND METHOD THEREOF

CROSS-REFERENCE TO RELATED APPLICATION

This application claims priority to Korean Patent Application No. 10-2017-0071620, filed Jun. 8, 2017, the entire content of which is hereby incorporated by reference.

BACKGROUND OF THE INVENTION

1. Field of the Invention

The present invention relates to a collective intelligence convergence system and a method thereof. More particularly, the present invention relates to a collective intelligence convergence system based on a required reading opinion and a method thereof which calculates a result using the required reading opinion which necessarily includes opinions of experts in a corresponding field and includes opinions of ordinary persons when a public opinion or questionnaire survey is conducted.

2. Description of Related Art

Existing opinion surveys, question surveys, or decision-making methods are conducted while numerical values are presented by majority rule against subjects and sufficient information required for the investigation is not received, and thus, it is general that the subjects depend on passive and improvisational responses without receiving a thinking time or information to be considered in decision making. Therefore, the results are often derived as the intention of the survey agency.

In Korean Patent Laid-Open No. 10-2009-0095097 (published on Sep. 9, 2009), there is published a system which operates a preliminary investigation process of a user public opinion related with a specific subject.

The publication invention is an invention relating to a system which operates a preliminary investigation process of a user public opinion related with a specific subject in which a specific subject requested by clients actively experiences a distribution process of own collective discussion among users participating in a cooperative discussion work related with a specific subject (hereinafter, referred to as "CDW") with subjectivity without unnecessary intervention by the survey agency (a discussion distribution process by a cooperative work of users in the same team, a discussion distribution process by a competition structure of users in different teams, or the like) to be widely visualized as a series of rational outcomes. Therefore, it is possible to quickly pre-determine a response of a highly reliable market (public) to the corresponding subject, and the preference of the highly reliable market (public) to the corresponding subject, and the like by the client before the execution of a specific business related to the subject and effectively develop and produce new products, business issues, political issues and social issues that meet the public's preferences through the collection, development and utilization of high-quality ideas.

The publication invention is an invention relating to preliminary investigation of a user public opinion related with a specific subject which derives a CDW result of a group selected by a manager on a specific subject to derives a report through evaluation of interested parties.

However, in the publication invention, since the CDW results are evaluated by users, clients and managers, final results are derived by allowing the interested parties to evaluate public opinion generated by the selected group on the specific subject As a result, there is a problem that the selection mistake of the group that generates the public opinion may occur and the derived public opinion is mistaken by the interested parties.

Therefore, there is a need for an invention capable of deriving deep and objective results by providing a required reading opinion to be necessarily read by participants and a selective reading opinion to be selectively read by the participants by participating experts for a presented issue to converge an agreement or opposition opinion and allow experts to present a background knowledge regarding grounds and detailed description of the agreement and opposition opinions on the presented issue and providing the presented issue and the background knowledge for the agreement and opposition opinions of the experts related with the issue to the participants to extract agreement or opposition opinions of the participants for the agreement and opposition opinions of the experts.

SUMMARY OF THE INVENTION

The present invention has been made in an effort to provide a collective intelligence convergence system and a method thereof capable of deriving deep and objective results by providing a required reading opinion to be necessarily read by participants and a selective reading opinion to be selectively read by the participants, by participating experts for a presented issue to converge an agreement or opposition opinion and allow experts to present a background knowledge regarding grounds and detailed description of the agreement and opposition opinions on the presented issue and providing the presented issue and the background knowledge for the agreement and opposition opinions of the experts related with the issue to the participants to extract agreement or opposition opinions of the participants for the agreement and opposition opinions of the experts.

According to a first aspect of the present invention, there is provided a system of converging opinions on an issue set by at least one expert terminal and at least one participant terminal which are connected with a management computer by a communication means.

The management computer includes an expert opinion management unit which receives and stores expert opinion data such as an opinion on agreement or opposition to a presented issue transmitted by at least one participating expert, at least one ground for the opinion, description of the opinion, and the like; a background knowledge management unit which provides at least one expert opinion data received by the expert opinion management unit to the participants to classify the provided expert opinion data into at least one required reading opinion data and at least one selective reading opinion data based on consent and non-consent data to the expert opinion data and giving score data and stores the classified data as a background knowledge about the issue; a participation data management unit which provides the background knowledge data stored in the background knowledge management unit to the participants to allow the participants to read the background knowledge data and receives participant opinion data including consent or non-consent data to the input required reading opinion data and selective reading opinion data and giving score data to process the received participant opinion data as collective intelligence convergence data; and an expert opinion ranking management unit which determines a ranking based on the participant opinion data stored in the participation data management unit to update the required reading opinion data and the selective reading opinion data based on the ranking and provides the updated data to the background knowledge management unit.

According to a second aspect of the present invention, there is provided a collective intelligence convergence method including: receiving, by a management computer, an agreement or opposition opinion on an issue from a predetermined number of related-field experts on the presented issue as expert opinion data including key grounds thereof and detailed description; receiving, by the management computer, participant opinion data including a consent or non-consent opinion and scores of the participants by providing the expert opinion data to the participants; determining, by the management computer, rankings of the expert opinion data based on the participant opinion data, determining a predetermined number of required reading opinion data to be necessarily read by the opinion presentation participants on the issue according to the rankings thereof, and determining a predetermined number of selective reading opinion data to be selectively read by the participants with respect to expert opinion data which is not included in the required reading opinion data and a separate opinion of the participants; receiving, by the management computer, participant opinion data including a consent or non-consent opinion and scores from the participants by providing the required reading opinion data and the selective reading opinion data to the participants; and deriving, by the management computer, collective intelligence convergence data for the issue based on the participant opinion data.

According to a third aspect of the present invention, there is provided a collective intelligence convergence method including: transmitting, by a management computer, an opinion presentation request related to an issue to an expert terminal by inquiring at least one expert in the field in an expert pool in associated with the issue received; performing, by the experts, expert authentication by accessing the management computer using expert terminals; providing, by the management computer, an expert opinion presentation form to the expert terminal of the experts whose authentication is completed; transmitting, by the expert terminals, to the management computer expert opinion data including an agreement or opposition opinion on the issue input by the experts, grounds and description data thereof to the opinion presentation form provided by the management computer; storing, by the management computer, the expert opinion data of the agreement or opposition opinion on the issue transmitted from the expert terminals; exposing, by the management computer, decision making information about the issue to participant terminals of participant members; performing, by the participant terminals, participant authentication by accessing the management computer; providing, by the management computer, a predetermined number of expert data for the issue to the participant terminals of the participants whose authentication is completed; transmitting to the management computer participant opinion data including consent and non-consent data for the expert opinion data on the issue input by the participants, score data thereon, and separate opinion data when a separate opinion of the participant is presented; determining, by the management computer, a predetermined number of high-ranking expert opinion data as required reading opinion data by giving a ranking to the expert opinion data based on the participant opinion data transmitted from the participant terminals and determining the expert opinion data which is not included in the required reading opinion data and the separate opinion data of the participants as the selective reading opinion data to store the data as background knowledge data; exposing, by the management computer, decision making information about the issue to participant terminals of participant members; performing, by the participant terminals, participant authentication by accessing the management computer; providing, by the management computer, background knowledge data for the issue to the participant terminals of the participants whose authentication is completed; transmitting to the management computer participant opinion data including consent and non-consent data for the required reading opinion data and the selective reading opinion data on the issue included in the background knowledge data input by the participants, and score data thereof; verifying, by the management computer, whether the opinion presentation of the participants participating in the opinion presentation is completed; verifying, by the management computer, whether the rankings of the required reading opinion data and the selective reading opinion data are changed based on the participant opinion data while receiving continuously the opinion presentation of the participants when it is verified that the opinion presentation of the participants is not completed; changing, by the management computer, the required reading opinion data and the selective reading opinion data themselves or the rankings thereof to provide the changed data or rankings to the participant terminals when it is verified that the rankings of the required reading opinion data and the selective reading opinion data are changed; and deriving, by the management computer, collective intelligence convergence data based on the received participant opinion data when it is verified that the opinion presentation of the participants is completed.

According to the present invention, it is possible to derive collective intelligence convergence data for a deep and objective issue by providing a required reading opinion to be necessarily read by participants and a selective reading opinion to be selectively read by the participants, by participating experts for a presented issue to converge an agreement or opposition opinion and allow experts to present a background knowledge regarding grounds and detailed description of the agreement and opposition opinions on the presented issue and providing the presented issue and the background knowledge for the agreement and opposition opinions of the experts related with the issue to the participants to extract agreement or opposition opinions of the participants for the agreement and opposition opinions of the experts.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENTS

Hereinafter, exemplary embodiments of the present invention will be described in detail with reference to the accompanying drawings.

For convenience of the description of the exemplary embodiments of the present invention, among terms used in the description of the exemplary embodiments of the present invention to be described below, configurations of the present invention may refer to configurations of hardware itself and also refer to configurations of a web program or computer program executed by using the hardware resources. For example, a management computer among the configurations of the present invention may be computer hardware itself and may be a web program or computer program executed by using the hardware resources of the computer.

Figure 1:
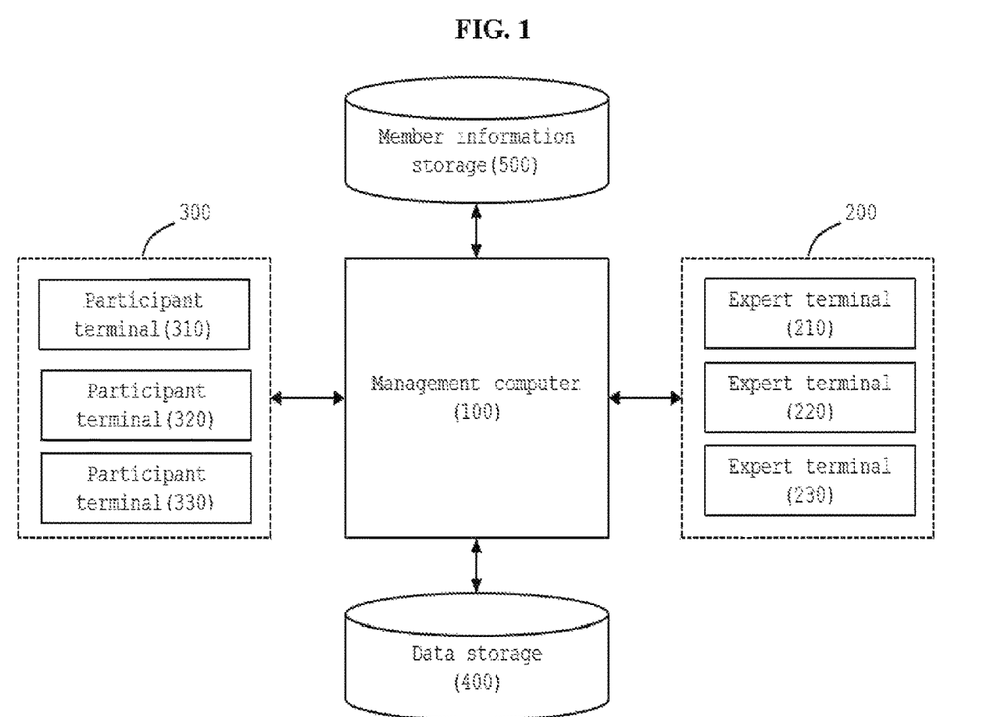
FIG. 1 is a schematic configuration diagram of an exemplary embodiment of a collective intelligence convergence system of the present invention.

FIG. 1 is a schematic configuration diagram of an exemplary embodiment of a collective intelligence convergence system of the present invention. As illustrated in FIG. 1, the collective intelligence convergence system of the present invention is a configuration including a management computer for providing and collecting data to a participating terminal to derive collective intelligence convergence data on an issue; at least one expert terminal accessing the management computer using a communication means to provide expert opinion data on the presented issue inputted by experts; at least one participant terminal accessing the management computer using the communication means to read the expert opinion data of the experts on the presented issue by the participants and provide participant opinions for the expert opinions; a data storage unit included in the management computer or accessing the management computer using the communication means to store data provided to the expert terminal and the participant terminal for converging the collective intelligence, the expert opinion data, and the participant opinion data; and a member information storage unit included in the management computer or accessing the management computer using the communication means to store information on expert members and information on participant members.

The management computer may be configured as a server computer including a web program or computer program for the collective intelligence convergence, and a communication means capable of communicating with the expert terminal and the participant terminal.

Further, the expert terminal and the participant terminal may be configured as desktop computers, laptop computers, tablet computers, and mobile communication terminals such as smart phones which may include a communication means capable of communicating with the management computer and execute web programs or computer application programs provided by the management computer.

Figure 2:
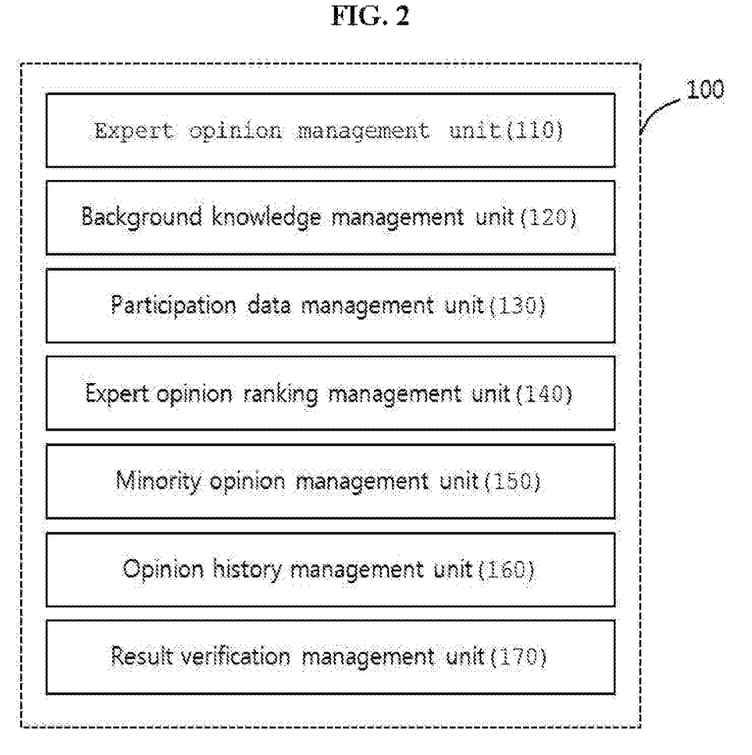
FIG. 2 is a schematic configuration diagram of an example of a manager computer which is a main part in the exemplary embodiment of the collective intelligence convergence system of the present invention.

FIG. 2 is a schematic configuration diagram of an example of a manager computer which is a main part in the exemplary embodiment of the collective intelligence convergence system of the present invention. As illustrated in FIG. 2, a management computer 100 of the present invention is a configuration including: an expert opinion management unit 110 which receives and stores expert opinion data such as an opinion on agreement or opposition to a presented issue transmitted by at least one participating expert, at least one ground for the opinion, description of the opinion, and the like; a background knowledge management unit 120 which provides at least one expert opinion data received by the expert opinion management unit 110 to the participants to classify and store the expert opinion data into at least one required reading opinion data and at least one selective reading opinion data on each opinion for agreement and opposition and provides the stored required reading opinion data and selective reading opinion data on each opinion for the agreement and opposition to at least one participant as a background knowledge for the issue; a participation data management unit 130 which reads the required reading opinion data and the selective reading opinion data on each opinion for agreement and opposition provided from the background knowledge management unit 120 and receives and stores collective intelligence data including input consent or non-consent opinion data and score data on the required reading opinion data and the selective reading opinion data; an expert opinion ranking management unit 140 which determines a ranking based on the collective intelligence data stored in the participation data management unit 130 to update the required reading opinion data and the selective reading opinion data based on the ranking and provides the updated data to the background knowledge management unit 120; a minority opinion management unit 150 which receives a small number of consents of the participants, but gives a ranking rising position to an opinion having a high score; an opinion history management unit 160 which provides comments on a source of the corresponding opinion data and a rebuttal or supplementary opinion when the participants read the required reading opinion data and the selective reading opinion data; and a result verification management unit 170 which generates a predetermined form of report based on the collective intelligence data stored in the participation data management unit 130 to provide the generated report to an issue provider and provides the collective intelligence data forming the basis of the report by a request of the issue provider.

Figure 3:
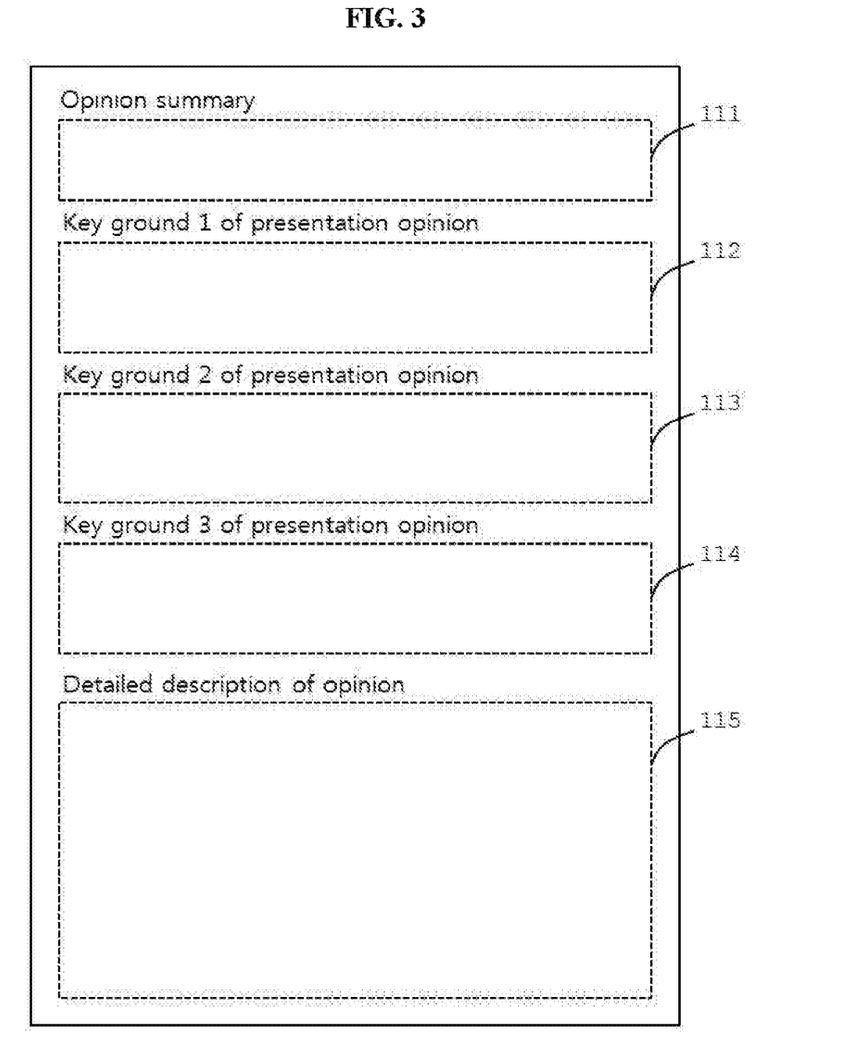
FIG. 3 is a schematic configuration diagram of an example of an expert opinion presentation form in the example of the manager computer which is the main part in the exemplary embodiment of the collective intelligence convergence system of the present invention.

FIG. 3 is a schematic configuration diagram of an example of an expert opinion presentation form in the example of the manager computer which is the main part in the exemplary embodiment of the collective intelligence convergence system of the present invention. As illustrated in FIG. 3, an expert opinion presentation form of the present invention is data which is provided to the expert terminal 200 by the management computer 100 and a configuration including an opinion summary input unit 111 for inputting an agreement or opposition opinion on the issue by the expert; key ground input units 112, 113, and 114 for inputting key grounds on the agreement or opposition opinion input by the opinion summary input unit 111 by the expert; and a details input unit 115 for inputting a detailed description on a reason for the agreement or opposition opinion by the expert.

Preferably, the opinion summary input unit 111 may be configured to input one line of data, for example, within 50 characters of the agreement or opposition opinion on the issue to be provided to the participant terminal 300. Further, the key ground input units 112, 113, and 114 a may be configured to restrict the key grounds for the agreement or opposition opinion on the issue to predetermined items, for example, three items and write the ground content within, for example, 200 characters. Further, the details input unit 115 may be configured not to restrict the number of characters to be input so as to describe the agreement or opposition opinion on the issue in detail.

Referring to FIGS. 1 to 3, the collective intelligence convergence system of the present invention will be described in more detail.

The management computer 100 inquires at least one expert in the field in an expert pool stored in the member information storage unit 400, preferably inquires at least six expert information in associated with the received issue and transmits an opinion presentation request message for the issue to the expert terminals 200 of the inquired experts. The experts who receive the message from the management computer 100 access the management computer 100 using the expert terminals 200 and perform authentication of the experts. The management computer 100 provides the expert terminals 200 of the experts whose authentication has been completed with an opinion presentation form to input the expert's opinion on the issue. The experts input the opinions of the experts on the issue in the opinion presentation form output to the expert terminals 200. The experts may first input a summary of the agreement or opposition opinion on the issue into one line, for example, 50 characters or less, in the opinion summary input unit 111 of the opinion presentation form. Then, the key ground input units 112, 113, and 114 may input the description within 200 characters based on the key grounds for the agreement or opposition reason for the issue, preferably, three grounds. The present invention is not limited thereto and three key grounds may also be presented and input. Next, the details input unit 115 may input the detailed description of the agreement or opposition reason for the issue. Preferably, the detailed description may not limit the number of characters. The management computer 100 receives the expert opinion data transmitted from the expert terminals 200 and stores the expert opinion data as background knowledge data on the agreement or opposition to the issue. The management computer 100 inquires participant member information stored in the member information storage unit 500 and transmits a participation message for the issue to the participant terminals 200 of a predetermined number of participant members. In this case, the present invention is not limited thereto and the participants accessing the management computer 100 may inquire the issue and participate in the issue. The participants who receive the participation message from the management computer 100 access the management computer 100 and perform authentication. The management computer 100 transmits and outputs the issue and the opinion summary data of the experts for the issue to the participant terminals 300 of the participants whose authentication is completed. The participants select the issue and the opinion summary data of the experts output by the participant terminals 300, verify the background knowledge data including the key grounds of the presentation opinion and the detailed description, and give scores according to consent or non-consent opinions for the verified expert opinion data and the empathy degree of the expert opinion data. Preferably, the score may be input in a range of 1 to 100 points for the consent or non-consent expert opinion data. It is preferred to input the score within the range of 51 to 100 for the consent expert opinion data, and the score within the range of 0 to 50 for the non-consent expert opinion data. Also, preferably, when the background knowledge data is verified, only when the key grounds and the detailed description of the expert opinion data are all read, the management computer 100 may be configured to give the consent or non-consent and the score for the corresponding expert opinion. The management computer 100 gives a ranking of the expert opinion data with reference to the consent or non-consent to the expert opinion data transmitted from the participant terminal 300 and score data thereof, determines a predetermined number of high-ranking expert opinion data as the required reading opinion data, and determines and stores a predetermined number of lower-ranking expert opinion data which is not included in the required reading opinion data as the selective reading opinion data. The management computer 100 inquires participant member information stored in the member information storage unit 500 and transmits a participation message for the issue to the participant terminals 200 of a predetermined number of participant members. In this case, the present invention is not limited thereto and the participants accessing the management computer 100 may inquire the issue and participate in the issue. The participants who receive the participation message from the management computer 100 access the management computer 100 and perform authentication. The management computer 100 transmits and outputs lists of the predetermined number of required reading opinion data and selective reading opinion data stored for the issue to the participant terminals 300 of the participants whose authentication is completed. The participants need to read the required reading opinion data from the required reading opinion data list and the selective reading opinion data list output to the participant terminals 300 and the selective reading opinion data may be configured to be read according to the selection of the participants. The participants input to the participant terminals 300 the participant opinion data including the consent and non-consent opinions for the required reading opinion data and the selective reading opinion data and the scores for the required reading opinion data and the selective reading opinion data which are consented and non-consented, and the participant terminal 300 transmits the participant opinion data to the management computer 100. The management computer 100 receives the participant opinion data transmitted from the participant terminals 300, calculates an average value of the scores given to the required reading opinion data and the selective reading opinion data for the agreement opinion and the opposition opinion of the experts by the participants, and generates the derived agreement and opposition opinions on the issue of the participants as the collective intelligence data.

In addition, in the exemplary embodiment of the present invention, the management computer 100 inputs to the participant terminals 300 participant opinion data including consent and non-consent opinions for the required reading opinion data and the selective reading opinion data read by the participants and scores of the required reading opinion data and the selective reading opinion data which are consented and non-consented and gives a ranking based on the participant opinion data transmitted from the participant terminals 300 when the participant terminals 300 transmit the participant opinion data to the management computer 100 to perform updating of the lists of the required reading opinion data and the selective reading opinion data. If there is selective reading opinion data having a higher ranking than the provided required reading opinion data, the higher-ranking selective reading opinion data is updated to the required reading opinion data, and the required reading opinion data having a lower ranking than the selective reading opinion data may be updated to the selective reading opinion data, and a configuration thereof may be further included.

In addition, in the exemplary embodiment of the present invention, in the process of giving a ranking to the expert opinion data with reference with the consent or the non-consent for the expert opinion data transmitted from the participant terminals 300 and the score data thereof, determining a predetermined number of high-ranking experts opinion data as the required reading opinion data, and determining and storing a predetermined number of the lower-ranking expert opinion data which is not included in the required reading opinion data, when there is the expert opinion data having a higher score than the stored required reading opinion data and selective reading opinion data among the expert opinion data receiving a small number of contents which are not included in the required reading opinion data and the selective reading opinion data, the management computer 100 may further include a configuration for updating the expert opinion data to the predetermined number of required reading opinion data and selective reading opinion data. As such, the required reading opinion data and selective reading opinion data themselves, and the rankings of the required reading opinion data and selective reading opinion data may be updated in real time.

In addition, the participant may input the rebuttal opinion or supplementary opinion while reading the required reading opinion data and selective reading opinion data on the agreement or opposition to the issue. Preferably, it is preferred to input a supplementary opinion and a rebuttal opinion in the opinion presentation form when the required reading opinion data and the selective reading opinion data are consented, but further complemented or not consented.

The management computer 100 may provide the supplementary opinion and the rebuttal opinion related thereto when providing the required reading opinion data and the selective reading opinion data to the participant terminals 300.

Further, when the participant selects specific data among the required reading opinion data and the selective reading opinion data, the management computer 100 may further include a means capable of providing a history formed for the required reading opinion data and the selective reading opinion data.

Further, in the exemplary embodiment of the present invention, the initial participants read the expert opinion data and classifies and stores the expert opinion data into the required reading opinion data and the selective reading opinion data on the agreement and opposition to the issue of the experts based on the consent or non-consent opinion and the participant opinion data giving the score and then provide the required reading opinion data and the selective reading opinion data to the participants to derive the final collective intelligence convergence data. However, in this case, the participants and the joiner may be distinguished or not.

Figure 4:
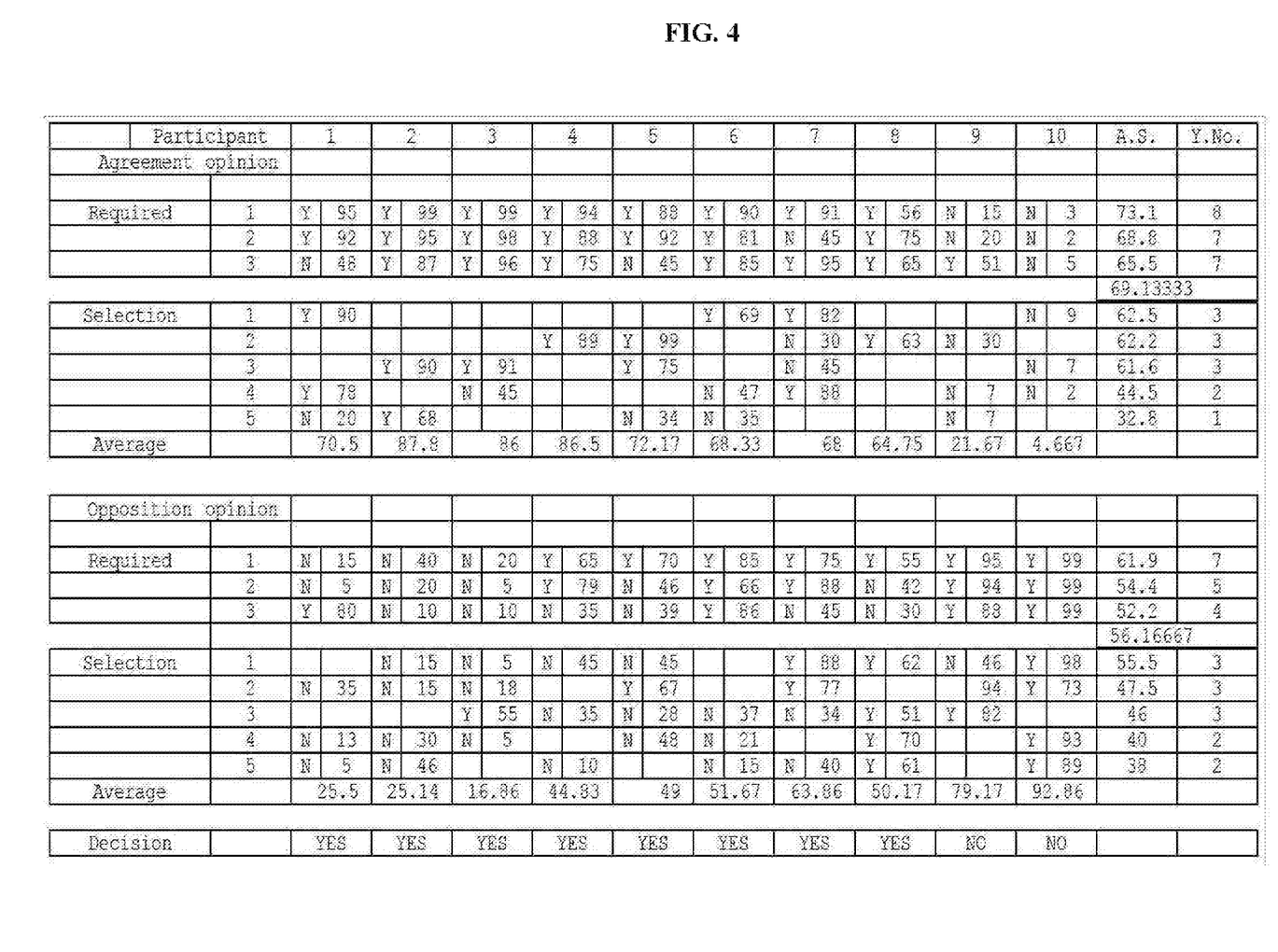
FIG. 4 is a schematic configuration diagram of an example of collective intelligence convergence data derived by the exemplary embodiment of the collective intelligence convergence system of the present invention.

FIG. 4 is a diagram for an example of collective intelligence convergence result data in the exemplary embodiment of the collective intelligence convergence system of the present invention.

As illustrated in FIG. 4, collective intelligence convergence result data of the present invention is set to three pieces of required reading opinion data and five pieces of selective reading opinion data of the agreement and opposition opinions on the expert opinion data of the agreement and opposition opinions on the issue to be provided to ten participants and represents the consent and non-consent of the required reading opinion data and the selective reading opinion data for the agreement opinion and the opposition opinion input by the participants and the scores thereof, and an average value of the scores of the required reading opinion data and the selective reading opinion data of each participant is calculated. In FIG. 4, an average score for the agreement opinion of Participant 1 is 70.5 and an average score for the opposition opinion is 25.5, so that the opinion on the issue of the Participant 1 is derived as agreement. In addition, an average score for the agreement opinion of Participant 10 is 4.667 and an average score for the opposition opinion is 92.86, so that the opinion on the issue of the Participant 10 is derived as opposition. In the same manner, the collective intelligence of the issue is calculated by 8 for agreement and 2 for opposition among ten participants and the collective intelligence convergence data may be converged by 80% for agreement and 20% for opposition.

Further, the result verification management unit 160 of the exemplary embodiment of the collective intelligence convergence system of the present invention is a configuration to notify the collective intelligence convergence data to the issue provider and verify the collective intelligence convergence result by the issue provider.

Figure 5:
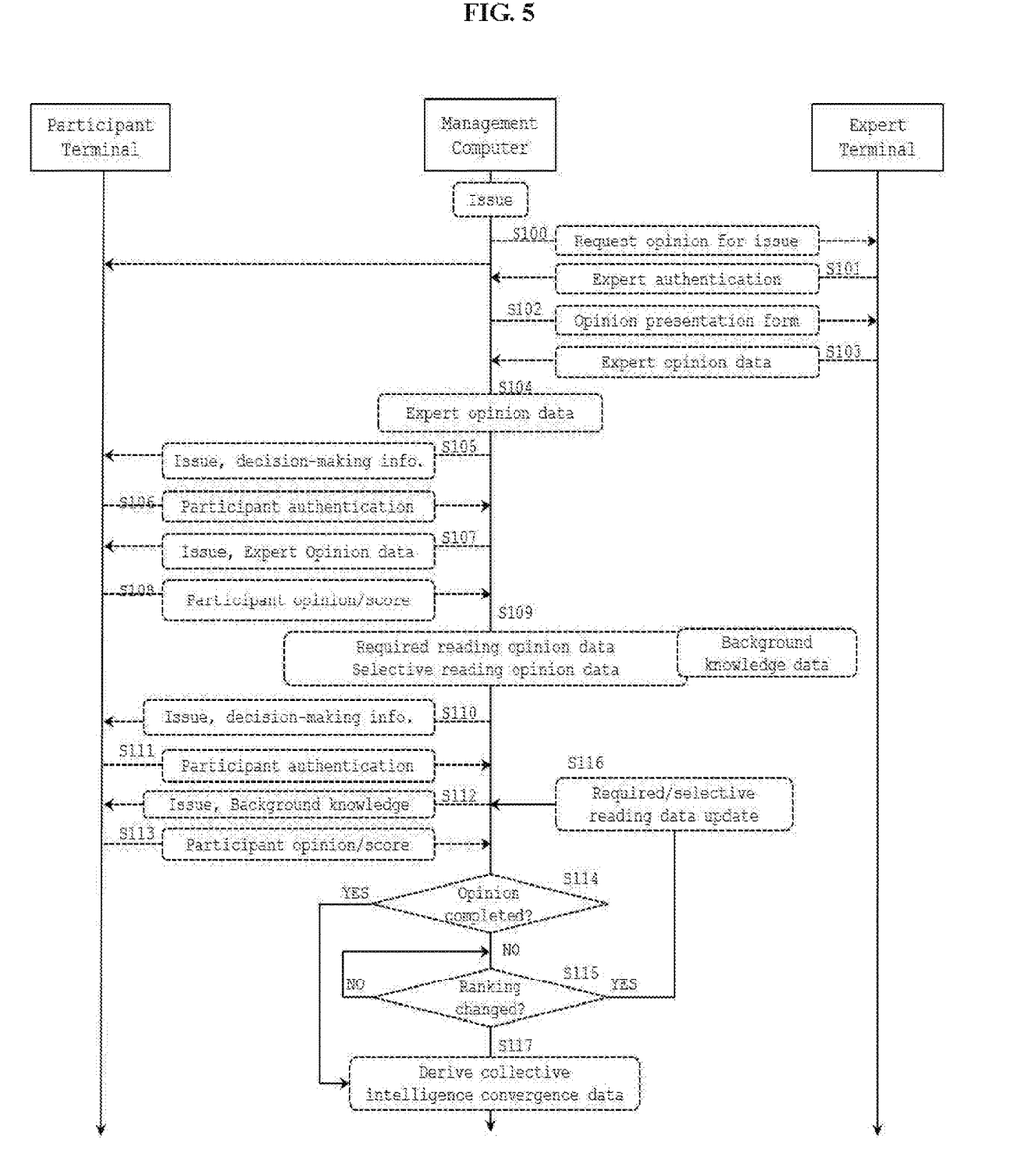
FIG. 5 is a flowchart for describing an exemplary embodiment of a collective intelligence convergence method of the present invention.

FIG. 5 is a flowchart for describing an exemplary embodiment of a collective intelligence convergence method of the present invention. As illustrated in FIG. 5, a collective intelligence convergence method of the present invention includes steps of: transmitting, by a management computer, an opinion presentation request for the issue to the expert terminal by inquiring at least one expert in the field in an expert pool in associated with the issue received (S100); performing, by the experts, expert authentication by accessing the management computer using the expert terminals (S101); providing, by the management computer, an expert opinion presentation form to the expert terminal of the experts whose authentication is completed (S102); transmitting, by the expert terminals, to the management computer expert opinion data including an agreement or opposition opinion on the issue input by the experts, grounds and description data thereof to the opinion presentation form provided by the management computer (S103); and storing, by the management computer, the expert opinion data of the agreement or opposition opinion on the issue transmitted from the expert terminals (S104); exposing, by the management computer, decision making information about the issue to participant terminals of participant members (S105); performing, by the participant terminals, participant authentication by accessing the management computer (S106); providing, by the management computer, a predetermined number of expert data for the issue to the participant terminals of the participants whose authentication is completed (S107); transmitting to the management computer participant opinion data including consent and non-consent data for the expert opinion data on the issue input by the participants, score data thereon, and separate opinion data when a separate opinion of the participant is presented (S108); determining, by the management computer, a predetermined number of high-ranking expert opinion data as required reading opinion data by giving a ranking to the expert opinion data based on the participant opinion data transmitted from the participant terminal and determining the expert opinion data which is not included in the required reading opinion data and the separate opinion data of the participants as the selective reading opinion data to store the data as background knowledge data (S109); exposing, by the management computer, decision making information about the issue to participant terminals of participant members (S110); performing, by the participant terminals, participant authentication by accessing the management computer (S111); providing, by the management computer, background knowledge data for the issue to the participant terminals of the participants whose authentication is completed (S112); transmitting to the management computer participant opinion data including consent and non-consent data for the required reading opinion data and the selective reading opinion data on the issue included in the background knowledge data input by the participants, and score data thereof (S113); verifying, by the management computer, whether the opinion presentation of the participants participating in the opinion presentation is completed (S114); verifying, by the management computer, whether the rankings of the required reading opinion data and the selective reading opinion data are changed based on the participant opinion data while receiving continuously the opinion presentation of the participants when the opinion presentation of the participants is not completed (S115); changing, by the management computer, the required reading opinion data and the selective reading opinion data themselves and the rankings thereof to provide the changed rankings to the participant terminals when it is verified that the rankings of the required reading opinion data and the selective reading opinion data are changed (S116); and deriving, by the management computer, collective intelligence convergence data based on the received participant opinion data when it is verified that the opinion presentation of the participants is completed (S117).

The exemplary embodiments of the present invention described above are only some of various exemplary embodiments. It is natural that various exemplary embodiments included in the spirit of the present invention are included in the scope of the present invention, in which a predetermined number of related-field experts on the issue presented in the present invention present expert opinion data including key grounds and detailed description thereof for the agreement or opposition opinion, determine rankings of the expert opinion data when the participants present consent or non-consent opinions, giving scores, and separate opinions of the participants by providing the expert opinion data to the participants, determine a predetermined number of required reading opinion data to be necessarily read by the opinion presentation participants on the issue according to the rankings, determine a predetermined number of selective reading opinion data to be selectively read by the participants with respect to expert opinion data which is not included in the required reading opinion data and separate opinions of the participants, provide the required reading opinion data and the selective reading opinion data to the participants to generate participant opinion data by giving the consent or non-consent opinion and the score, and derive collective intelligence convergence data for the issue based on the participant opinion data.

What is claimed is:

1. A system for collective intelligence convergence comprising:
   a management computer including computer hardware that causes the system to perform:
   receiving expert opinion data such as an opinion on agreement or opposition to a presented issue, at least one ground for the opinion, description of the opinion provided by at least one expert;
   storing the expert opinion as background knowledge data on the opinion of agreement or opposition of the experts to the presented issue;
   providing the presented issue and the background knowledge data based on expert opinions to a predetermined number of participants, and receiving opinions of the participants including consent or non-consent data regarding the expert opinion and score data given provided by the participants;
   determining the ranking of the expert opinion data with reference to the opinions of the participants, determining a predetermined number of high-ranking expert opinion data as at least one required reading opinion data that must be read, and determining a predetermined number of low-ranking expert opinion data as at least selective reading opinion data that selectively can be read;
   providing a set number of required reading opinion data and the selective reading opinion data to a predetermined number of participants, receiving participant opinion data including opinions of consent or non-consent data regarding the required reading opinion data and the selective reading opinion data and score data given to each of them;
   generating the opinion data of the participants as collective intelligence convergence data; and
   when there is the expert opinion data having a higher score than the stored required reading opinion data and selective reading opinion data among the expert opinion data receiving a small number of contents which are not included in the required reading opinion data and the selective reading opinion data, updating the expert opinion data to the predetermined number of required reading opinion data and selective reading opinion data,
   wherein the ranking of the required reading opinion data and the selective reading opinion data, and the types of the required reading opinion data and the selective reading opinion data are updated by a ranking determined based on the participant opinion data,
   wherein the collective intelligence convergence includes, calculating an average value of the scores given by each participant to each of the required reading opinion data and each of the selective reading opinion data for the agreement opinion of experts, and an average value of the scores given by each participant to each of the required reading opinion data and each of the selective reading opinion data for the opposition opinion of experts, and determining consent opinion or non-consent opinion of each participant regarding the agreement opinion or opposition opinion of the experts based on calculated averages,
   wherein the larger of the number of the consent opinion and the number of the non-consent opinion is determined as the collective intelligence for the presented issue, and
   wherein the required reading opinion data and selective reading opinion data themselves, and the rankings of the required reading opinion data and selective reading opinion data are updated in real time.

2. The system for collective intelligence convergence of claim 1, further comprising:
   providing information data on a source of the corresponding opinion data and a rebuttal or supplementary opinion when the participants read the required reading opinion data and the selective reading opinion data.

3. The system for collective intelligence convergence of claim 1, further comprising:
   providing the report generated in a format set based on the collective intelligence convergence data and the collective intelligence convergence data based on the report to the issue provider so as to be verified by the issue provider.

4. The system for collective intelligence convergence of claim 1, further comprising:
providing, by the management computer, an opinion presentation form to expert terminals of the experts,
wherein the opinion presentation form includes an opinion summary input field inputting a predetermined number of characters for the agreement or opposition opinion on the issue; key ground input fields for inputting key grounds on the agreement or opposition opinion by the predetermined number; and a detailed description input field for inputting a detailed description of the agreement or opposition opinion on the issue.

5. A collective intelligence convergence method comprising:
receiving, by a management computer, expert opinion data provided by at least one expert such as an opinion on agreement or opposition to a presented issue, at least one ground for the opinion and description of the opinion;
storing, by the management computer, the expert opinion as background knowledge data on the opinion of agreement or opposition of the experts to the presented issue;
providing, by the management computer, the presented issue and the background knowledge data based on expert opinions to a predetermined number of participants, and receiving opinions of the participants including consent or non-consent data regarding the expert opinion, score data given provided by the participants;
determining, by the management computer, a ranking of the expert opinion data with reference to the opinions of the participants, determining a predetermined number of high-ranking expert opinion data as at least one required reading opinion data that must be read, and determining a predetermined number of low-ranking expert opinion data as at least selective reading opinion data that selectively can be read;
providing, by the management computer, a set number of required reading opinion data and the selective reading opinion data to a predetermined number of participants, receiving participant opinion data including opinions of consent or non-consent data regarding the required reading opinion data and the selective reading opinion data and score data given to each of them;
generating, by the management computer, the opinion data of the participants as collective intelligence convergence data; and
when there is the expert opinion data having a higher score than the stored required reading opinion data and selective reading opinion data among the expert opinion data receiving a small number of contents which are not included in the required reading opinion data and the selective reading opinion data, updating, by the management computer, the expert opinion data to the predetermined number of required reading opinion data and selective reading opinion data,
wherein the ranking of the required reading opinion data and the selective reading opinion data, and the types of the required reading opinion data and the selective reading opinion data are updated by a ranking determined based on the participant opinion data,
wherein the collective intelligence convergence includes calculating an average value of the scores given by each participant to each of the required reading opinion data and each of the selective reading opinion data for the agreement opinion of experts, and an average value of the scores given by each participant to each of the required reading opinion data and each of the selective reading opinion data for the opposition opinion of experts, and determining consent opinion or non-consent opinion of each participant regarding the agreement opinion or opposition opinion of the experts based on calculated averages,
wherein the larger of the number of the consent opinion and the number of the non-consent opinion is determined as the collective intelligence for the presented issue, and
wherein the required reading opinion data and selective reading opinion data themselves, and the rankings of the required reading opinion data and selective reading opinion data are updated in real time.

6. A collective intelligence convergence method comprising:
transmitting, by a management computer, an opinion presentation request related to an issue to an expert terminal by inquiring at least one expert in the field in an expert pool in associated with the issue received;
performing, by the experts, expert authentication by accessing the management computer using expert terminals;
providing, by the management computer, an expert opinion presentation form to the expert terminal of the experts whose authentication is completed;
transmitting, by the expert terminals, to the management computer expert opinion data including an agreement or opposition opinion on the issue input by the experts, grounds and description data thereof to the opinion presentation form provided by the management computer;
storing, by the management computer, the expert opinion data of the agreement or opposition opinion on the issue transmitted from the expert terminals;
exposing, by the management computer, decision making information about the issue to participant terminals of participant members;
performing, by the participant terminals, participant authentication by accessing the management computer;
providing, by the management computer, a predetermined number of expert data for the issue to the participant terminals of the participants whose authentication is completed;
transmitting to the management computer participant opinion data including consent and non-consent data for the expert opinion data on the issue input by the participants, score data thereon, and separate opinion data when a separate opinion of the participant is presented;
determining, by the management computer, a predetermined number of high-ranking expert opinion data as required reading opinion data by giving a ranking to the expert opinion data based on the participant opinion data transmitted from the participant terminals and determining the expert opinion data which is not included in the required reading opinion data and the separate opinion data of the participants as the selective reading opinion data to store the data as background knowledge data;
exposing, by the management computer, decision making information about the issue to participant terminals of participant members; performing, by the participant terminals, participant authentication by accessing the management computer;

providing, by the management computer, background knowledge data for the issue to the participant terminals of the participants whose authentication is completed;

transmitting to the management computer participant opinion data including consent and non-consent data for the required reading opinion data and the selective reading opinion data on the issue included in the background knowledge data input by the participants, and score data thereof;

verifying, by the management computer, whether the opinion presentation of the participants participating in the opinion presentation is completed;

verifying, by the management computer, whether the rankings of the required reading opinion data and the selective reading opinion data are changed based on the participant opinion data while receiving continuously the opinion presentation of the participants when it is verified that the opinion presentation of the participants is not completed;

changing, by the management computer, the required reading opinion data and the selective reading opinion data themselves or the rankings thereof to provide the changed data or rankings to the participant terminals when it is verified that the rankings of the required reading opinion data and the selective reading opinion data are changed; and deriving, by the management computer, collective intelligence convergence data based on the received participant opinion data when it is verified that the opinion presentation of the participants is completed, wherein the deriving the collective intelligence convergence data comprises:

proving, by the management computer, a predetermined number of the required reading opinion data and the selective reading opinion data of agreement and opposition opinions on the expert opinion data of the agreement or opposition opinion on the issue to a predetermined number of participants;

representing, by the management computer, consent, non-consent, and scores thereof of the required reading opinion data and the selective reading opinion data for the agreement and opposition opinions input by the participants;

calculating an average value of the scores given by each participant to each of the required reading opinion data and each of the selective reading opinion data for the agreement opinion of experts, and an average value of the scores given by each participant to each of the required reading opinion data and each of the selective reading opinion data for the opposition opinion of experts; and determining consent opinion or non-consent opinion of each participant regarding the agreement opinion or opposition opinion of the experts based on calculated averages, and wherein the larger of the number of the consent opinion and the number of the non-consent opinion is determined as the collective intelligence for the presented issue.

\* \* \* \* \*